3,031,655
ENCAPSULATED PANEL MOUNTING AMPLIFIER INDICATING LAMP ASSEMBLY
Foy J. Temple, Tustin, and Bayard T. Burson, Santa Ana, Calif., assignors to Electronic Engineering Company of California, Santa Ana, Calif., a corporation of California
Filed Apr. 16, 1959, Ser. No. 806,835
4 Claims. (Cl. 340—366)

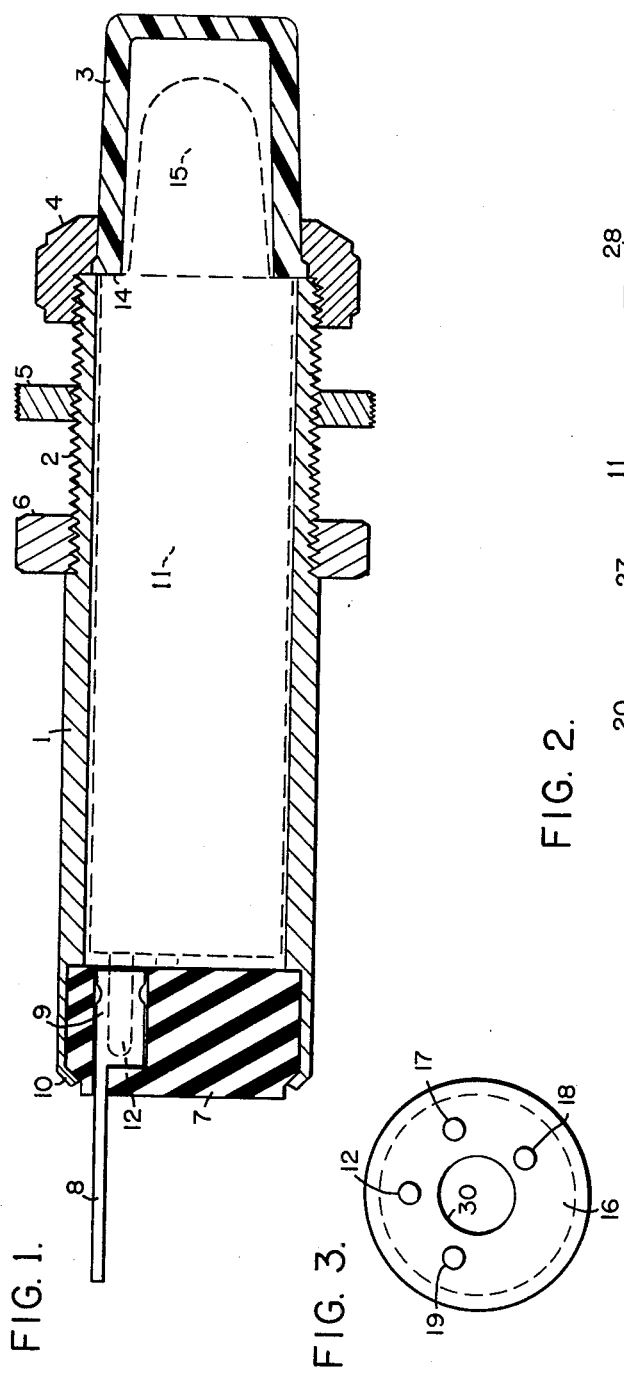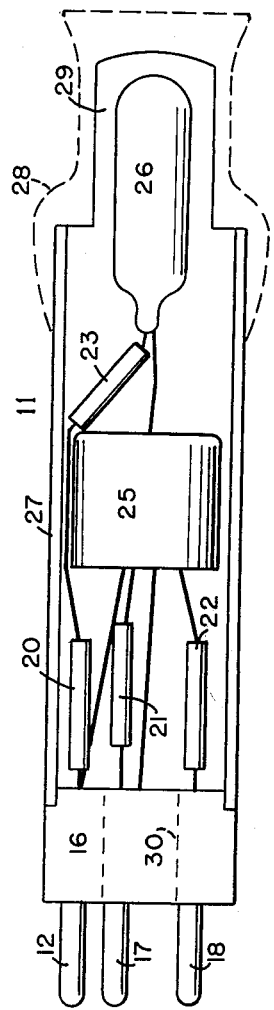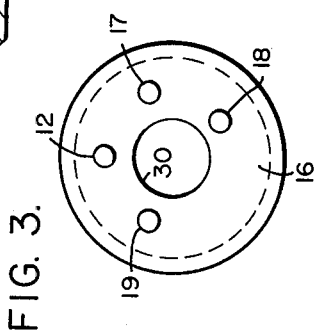
INVENTORS
FOY J. TEMPLE
BAYARD T. BURSON
BY Harry R. Lubcke
AGENT United States Patent Office 3,031,655
Patented Apr. 24, 1962

Our invention relates to a visual indicator to indicate the status of an electrical circuit and particularly to such a device that can be easily replaced in electrical equipment.

It has for some time been considered desirable to provide illuminable indicators of the status of electrical circuits in complex electrical equipment. However, these indicators have invariably mounted directly in the equipment and have been soldered to the electrical circuit involved. The removal of a defective indicator has required that the equipment be made inoperative, the connections to the circuit involved unsoldered by work within the equipment, and the indicator disengaged mechanically by removal of a nut behind the equipment panel or the equivalent.

Recently, indicators have become available which have electrical circuit elements within themselves. An example is one which employs a transistor and appropriate resistors to provide amplification between the circuit from which the indication is taken and the indicator lamp itself. The indicator lamp is often a miniature neon lamp and requires an appreciable current to give satisfactory illumination. Certain equipment circuits are incapable of supplying this current and still function as required as a part of the equipment. Accordingly, the transistorized indicator has been a step forward in circuitry, but until our invention has been a step backward in the physical embodiment of apparatus.

Briefly, we have been able to bring such an indicator to a satisfactory degree of convenience by a wide departure from previous structures. A hollow cylindrical outer housing is permanently mechanically and electrically installed in the equipment. The several elements required for the indicator per se are correctly positioned in manufacture and then are encapsulated by either of two methods so that a single monolithic cylinder results, transparent at least at the indicator lamp end. The encapsulation may be suitably machined to close tolerances for interchangeability and can be placed within its housing entirely from the front of the equipment panel. The end of the encapsulation opposite the lamp is provided with electrical contacts, such as several male contacts. These engage companion contacts, such as several female contacts, when the encapsulation is fully within the outer housing. In this way necessary electrical connections are made automatically by merely inserting the encapsulation.

An object of our invention is to provide a conveniently replaceable electrical indicator.

Another object is to accomplish electrical connection of a transistorized indicator automatically upon manipulating the same with respect to optical replacement.

Another object is to accomplish encapsulation of an indicator in a pre-formed manner to accommodate particular circuit elements.

Other objects will become apparent upon reading the following detailed specification and upon examining the accompanying drawings, in which are set forth by way of illustration and example certain embodiments of our invention.

FIG. 1 shows an assembled sectional view of our indicator,

FIG. 2 shows the encapsulation only, indicating the pre-formed parts in elevation in the nature of a sectional illustration, and FIG. 3 shows an end view of the contact portion of the encapsulation.

In FIG. 1 numeral 1 indicates an outer cylindrical housing preferably fabricated of a metal such as aluminum. This may be given an anodized finish. It is threaded at the front end with threads 2. A molded plastic lens 3 is made of a high impact polystyrene in the shape of a hollow cylinder with a closed front end. A lens retainer nut 4 has a forward enveloping portion to surround a rear circumferential lip of lens 3, and threads to engage those 2 of housing 1. With this structure one can unscrew nut 4 with the fingers and remove lens 3. This allows access to the inner part of the housing and replacement of the cylindrical element carrying the circuitry, to be later described. While element 3 is described as a "lens" in the trade it is understood that it may or may not have optically refractive properties.

A visual indicator of this type is invariably mounted upon a panel of some sort, and so a knurled ring nut 5 is provided upon threads 2 to fasten the housing at the front surface of the panel and a jam nut 6 at the rear surface thereof. (The panel is not shown.)

The rear structure of the housing is completed by a socket 7. This is formed of a suitable insulating material, such as Bakelite or epoxy resins, and has a generally solid cylindrical shape. This element is formed to receive electrical connections, both external and internal, and so has a plurality of cavities into which female socket metallic connectors are positioned. We find it desirable to space these connectors around a circle a distance apart sufficient to accommodate five connectors but to only provide four cavities. Since the blank position does not have a cavity a four terminal plug is always uniquely positioned in the socket.

In FIG. 1 one such cavity and connector is shown. The latter has a rearwardly extending tongue 8 which is inserted from the front of the socket through a rectangular slit at the rear thereof. The connector also has a forward female portion 9 that fits into the cavity previously mentioned.

The socket as a whole is received into a rear internal bore of greater diameter than the rest of housing 1 and is retained therein by a rolled-over lip 10 at the rear extremity of the housing.

Inner cylindrical element 11 is shown dotted in FIG. 1 to indicate how it fits mechanically into the housing. Male pins 12 engage socket connectors 9 and the front of the encapsulation cylinder is held under the rearward flange 14 of lens 3. A forward projection of the cylinder contains the illuminating element of the indicator, at 15.

The inner element is shown in greater detail in FIGS. 2 and 3.

FIG. 2 is devoid of sectioning for reasons of clarity and also because it is the view obtained with clear plastic encapsulation whether or not the view is actually sectional.

As one alternate construction, the several circuit elements of cylindrical element 11 can be encapsulated by flowing liquid encapsulating material around and through the circuit elements to give the final external shape shown in FIG. 2. However, we have found a superior manner of forming this encapsulation, as follows.

In FIG. 2, base 16 forms the rear end of the encapsulation. It may be fabricated of a heat-resistant polymide insulating substance. It has a plurality of male pins 12, 17, 18, 19, which pins are shown more completely in FIG. 3.

The electrical circuit of our illustrative indicator is comprised of several resistors, as four, 20, 21, 22, 23, a transistor 25, and a neon glow lamp 26. The incoming electrical energy indicating the status of the circuit involved enters via the resistors to the left, passes through the transistor, and is given current amplification thereby. The output circuit of the transistor is connected to additional resistor 23 and to glow lamp 26. Normally, the glow lamp is either illuminated or dark depending upon the status of the original circuit.

In fabrication, the recited circuit elements are connected to each other and to pins 12, 17, 18, 19 so that a reasonably stable mechanical structure is formed. Numeral 27 (FIG. 2), indicates a hollow tube of epoxy material having a relatively thin wall. The circuit elements 20–26 are pushed into tubing 27 and base 16 is nested thereinto, as shown in FIG. 2. A plastic wax mold 28 is formed by a separate known process and this mold is placed in position over tubing 27 as shown dotted in FIG. 2.

This assembly is then positioned vertically, with the base 16 at the top. Hole 30, shown in both FIGS. 2 and 3, is formed in the original fabrication of base 16. Through this hole is poured a suitable liquid epoxy material further described below. All voids around the circuit elements and including hole 30 are thus filled. Upon curing, a solid encapsulation results. The plastic mold 28 is then stripped off and discarded.

The epoxy must not require a curing temperature in excess of that considered safe for the electrical components. For transistors this is of the order of 150° F. This can be realized with commercially obtainable epoxys, such as the product of the Bakelite Corporation. The curing time may be anything from one-half to six hours, depending upon the curing agent used. We prefer a curing time of two hours.

The important result of curing the initially composite epoxy structure of FIG. 2 is that it becomes monolithic. The large diameter transistor 25 is centered in the monolith because epoxy tube 27 was employed. Such centering we have found to be quite difficult when tube 27 is not employed. Poor centering gives a monolith that is very weak at one side and easily cracks or breaks. In order that the transistor shall not flow during curing the curing temperature of tube 27 may be selected at a higher value than that of the subsequently poured-in epoxy.

The base 16 need not be epoxy per se, as long as the material thereof bonds to epoxy. This property is characteristic of several known insulators employed in electronic apparatus and so a range of materials may be employed.

It will be seen that our pre-fabricated epoxy-bonded structure is novel, highly satisfactory and suited to more rapid manufacture than would otherwise be the case in the absence of special automatic machinery to accomplish this epoxy molding operation. Such machinery cannot be economically justified in anything but very large quantity production.

It is important that portion 29 of the monolith be transparent or at least translucent so that illumination from lamp 26 will pass through that portion and through lens 3 in order to be observed by the operator of the equipment. Distinctive colors, if desired, may be incorporated in portion 29, lens 3, or as a separate colored gelatine filter between the two. On the other hand, it is not essential that tubing 27 be transparent, nor any other portions of the monolith than portion 29.

In the final curing process it will be noted that a metal mold or the equivalent is not required and so this portion of the processing can be carried out leisurely without typing-up expensive molds.

Reasonable dimensional stability can be achieved in our inner cylindrical element 11 by easily understood choices of tube 27 and base 16. However, the monolith can be machined after fabrication. This we have performed on a centerless grinder and have thereby obtained a cylinder of high concentricity and close tolerance to fit within outer housing 1. This fit may be as close as .005", although we prefer this to be .020".

Although it has several electrical components in it and requires four input connections it is seen that our indicator can be completely replaced without tools of any kind and without disturbing the general circuit with which it coacts. It may be replaced in the overall equipment, say a computer, without ceasing the operation thereof. Continuity of operation of many equipments of this class is important and so our indicator has unusual importance in that field.

Size is not a restrictive parameter upon our invention. The drawings herein are several times full size for sake of clarity. The outer diameter of housing 1 is often one-half inch.

It will be understood that other proportions for our structure may be chosen for particular conditions, and that the structure resulting would not depart from our inventive concept.

Variations in the electrical or electronic circuit and the nature of the indication to the operator may also be taken without departing from the scope of our invention.

Changes in the steps of assembly and processing may also be taken under the broad concept of obtaining a monolith as a final result.

Having thus fully described our invention and the manner in which it is to be practiced, we claim:

1. An electrical indicator assembly for mounting in a hole in a panel or the like, comprising: a hollow housing, said housing being open at one end and having electrical terminal means positioned adjacent the other end and extending from the interior of said housing to the exterior thereof; means for mounting said housing in a hole in a panel or the like; a capsule of electrically non-conducting encapsulating material; amplifier means, having an output, embedded within said capsule; illuminating means, having terminals, embedded within said capsule adjacent one end thereof; said encapsulating material which surrounds said illuminating means admitting the passage of light; said output of said amplifier being electrically connected to said terminals of said illuminating means; electrical connector means attached to the exterior of said capsule at the end thereof opposite the end near which said illuminating means is located; said electrical connector means being electrically connected to said amplifier means; said capsule adapted to being inserted into said hollow housing through said open end thereof with a close sliding fit, said capsule electrical connector means adapted to mate with said housing electrical terminal means when said capsule is so inserted; said end of said capsule containing said illuminating means being positioned adjacent said open end of said housing when said capsule is so inserted; and easily releasable means for retaining said capsule fixedly within said housing.

2. The electrical indicator assembly of claim 1 in which said open end of said housing is closed by a detachable light admitting cover.

3. The electrical indicator assembly of claim 2 in which said open end of said housing is externally threaded; in which said cover bears upon said capsule; and in which said easily releasable means for retaining said capsule fixedly within said housing comprises a nut bearing upon said cover and engaging said external threads at said open end of said housing, whereby both said capsule and said cover are clamped in fixed relationship to said housing.

4. The method of fabricating cylindrical assemblies of encapsulated electrical components to small tolerances where the exterior dimension of the largest electrical component closely approximates the desired circumference of the assembly, comprising: forming a matrix whose outer cylindrical wall comprises a rigid cylinder of encapsulating material; assembling the electrical components to be encapsulated within the matrix, connecting them electrically to each other and forming a relatively rigid structure; filling said matrix with liquid encapsulating material miscible with the electrical components and with the material of the rigid cylindrical wall; curing the whole to obtain a monolithic encapsulation; and centerless grinding said encapsulation to a size closely approximating the outer dimension of the largest electrical component therein.

References Cited in the file of this patent

UNITED STATES PATENTS

| | | |
|---|---|---|
| 2,424,574 | Marco | July 29, 1927 |
| 2,737,579 | Wehrlin et al. | Mar. 6, 1956 |
| 2,740,111 | Bogue et al. | Mar. 27, 1956 |
| 2,762,999 | Huber | Sept. 11, 1956 |
| 2,777,942 | Lester | Jan. 15, 1957 |
| 2,790,094 | Smith et al. | Apr. 23, 1957 |
| 2,803,816 | Alden | Aug. 20, 1957 |